Feb. 22, 1938.  C. HECKMAN  2,109,290
TRANSMISSION
Filed Feb. 20, 1936  3 Sheets-Sheet 2

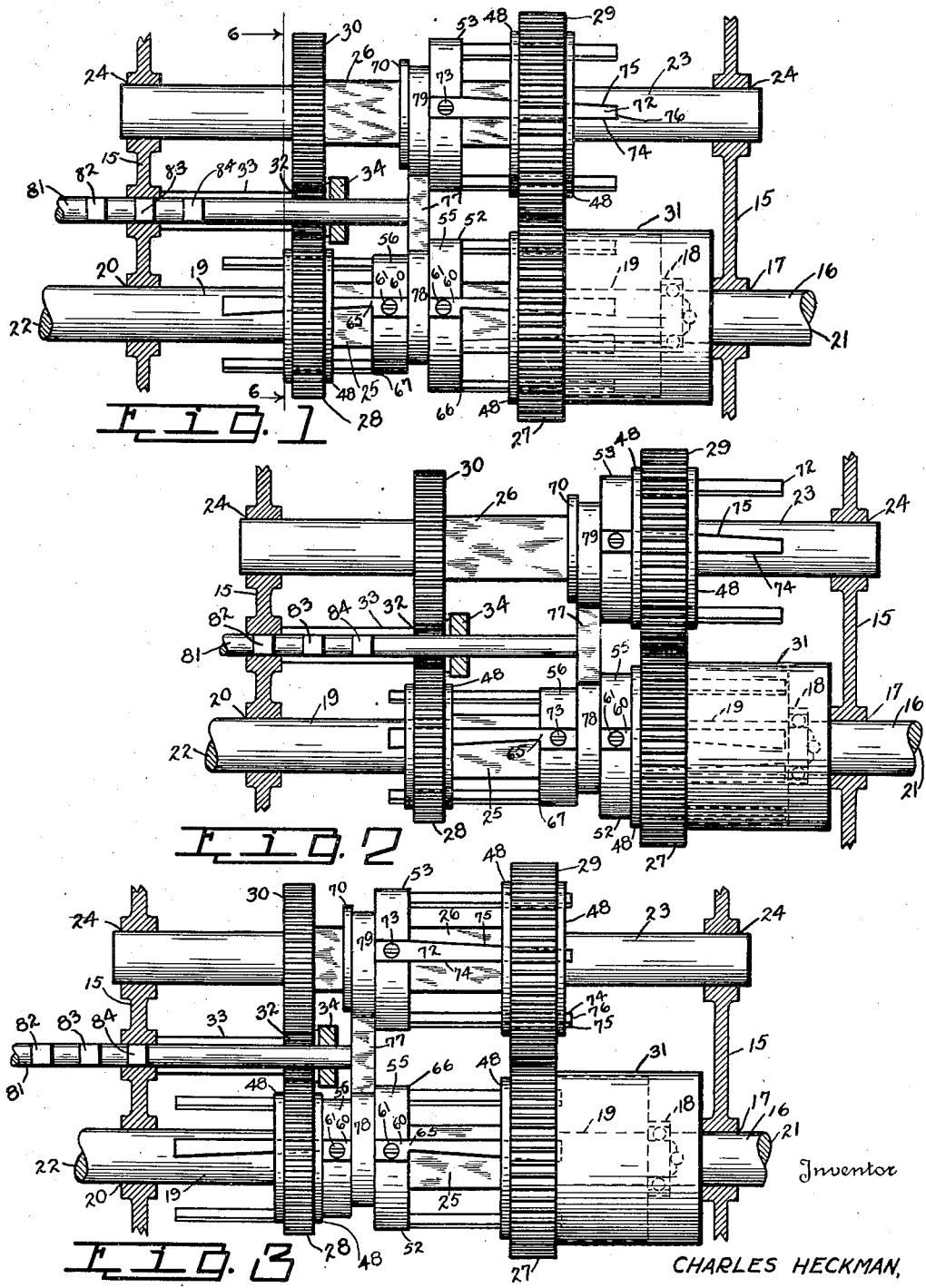

Inventor
CHARLES HECKMAN
By
J. B. Dickman, Jr.
Attorneys

Feb. 22, 1938.   C. HECKMAN   2,109,290
TRANSMISSION
Filed Feb. 20, 1936   3 Sheets-Sheet 3

Inventor
CHARLES HECKMAN

By J. B. Dickman, Jr.
Attorney

Patented Feb. 22, 1938

2,109,290

UNITED STATES PATENT OFFICE 2,109,290

TRANSMISSION

Charles Heckman, West Palm Beach, Fla.

Application February 20, 1936, Serial No. 64,974

6 Claims. (Cl. 74—377)

The present invention relates to a transmission adapted for use with boats, launches, vehicles and the like propelled by internal combustion engines.

The principal object of the transmission is the provision of shifting clutch locks, with means for controlling the forward or reverse movement of a boat, vehicles or the like and the shifting of said locks at any speed at any time.

Another object of the present invention is the provision of a transmission in which the gears are always in mesh.

A still further object of the present invention is the provision of mechanism within the gears of the transmission for controlling the rotation of the gears at variable speeds without damage to the assembly.

A still further object of the present invention is the provision of a transmission in which the counter shaft rotates in only the reverse position.

A still further object of the present invention is the provision of a transmission in which means are provided for the synchronous movement of the shifting locks.

A still further object of the present invention is the provision of a transmission in which the gears may rotate freely around the operating means within the assembly.

The novel structural features of my transmission, its mode of manipulation and the many advantages therein will be more readily understood by persons familiar with the art, by reference to the following detailed description, taken in conjunction with the accompanying drawings, wherein I have illustrated a practical and workable embodiment of the invention, and in which showing:—

Figure 1 is a view partly in vertical section and partly in elevation, of a transmission, of gearing constructed in accordance with the teaching of this invention illustrating the transmission in neutral position, the housing and some of the parts being shown fragmentarily and in section.

Figure 2 is a view similar to Figure 1, illustrating the transmission in position for forward movement.

Figure 3 is a view similar to Figure 1, illustrating the transmission in position for reverse movement.

Figure 4:
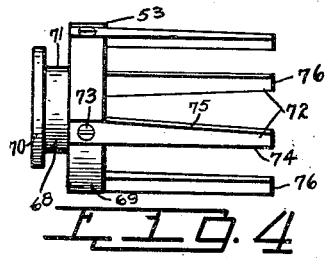
Figure 4 is a detail of one form of sliding transmission lock as used in the transmission.

Referring to the drawings which illustrate the preferred structure of my invention, the numeral 15 represents the walls of a casing or housing. The drive shaft is a bi-sectional shaft and comprises shaft section 16 that is journaled in suitable bearings 17 in the casing 15; one end of the shaft section 16 at 16' is threaded and engages a threaded opening 16'' in a cylindrical housing 31, the housing 31 having annular recesses 31' and 31'' to be later described, the shaft section 16 being additionally secured to the housing 31 by a member 16''' that may be a wedge, pin or screw. The shaft section 16 at 16' is provided with a bore 16'''' that receives a portion of a shank 19' of the shaft section 19, the section 19 being journaled in suitable bearings 20 in the casing 15. The shank portion 19' being housed in the bore 16'''', the bore serves as a guide bearing, and by this construction the shank and bore also serve as a means for assisting in supporting the shaft sections 16 and 19 and keeping them in horizontal alignment. The shank 19' has mounted thereon a race bearing 19", the bearing being housed in the recessed portion 31" in the housing 31. The part of the shaft indicated by the numeral 21 connects with a source of power, and the part 22 of the shaft 19 connects to a propeller shaft or any other suitable propelling means in which an internal combustion engine is employed. A counter shaft 23 is journaled in suitable bearings 24 and this shaft is in spaced relation to shafts 16 and 19. The shafts 19 and 23 are each provided with a square portion 25 and 26 respectively for a purpose to be later described, shaft 19 carrying gear 28, shaft 23 carrying gears 29 and 30, and the manner in which these gears are mounted on shafts 19 and 23 will be more fully described later on in the specification, gear 27 being fixedly and detachably secured in any suitable manner to the cylindrical housing 31, and by way of illustration I have shown screws 31'''. It is to be noted that gears 27 and 29 are of the same diameter, and they are of greater diameter than gears 28 and 30 which are of the same diameter. The gears 27, 28, and 29 are in the form of a band or ring for a purpose to be later described. Gear 30 is solid and it is fixedly secured to the countershaft 23 by keying thereto, or by any other suitable securing means. Intermediate the gears 28 and 30 is a pinion gear 32 which permanently meshes with gears 28 and 30, and this pinion gear is secured to a shaft 33, one end of the shaft being journaled in suitable bearings in the casing 15, the other end of the shaft being journaled in a transverse bar 34, the ends of the bar being secured in any suitable manner to the inner front and back walls of the casing 15.

Figure 7:
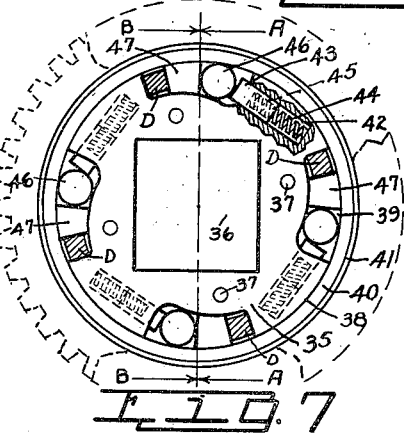
Figure 7 is an enlarged detail elevational view of mechanism housed in some of the gears, illustrating the position of some of the parts when in locked position in the gears, and rotating with the gears, the gear being outlined in dotted lines and broken, the fingers being shown in cross section.
Figure 14:
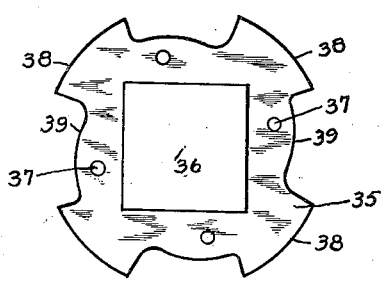
Figure 14 is a detail of the member housing the cam operating mechanism and housed in some of the gears.
Figure 15:
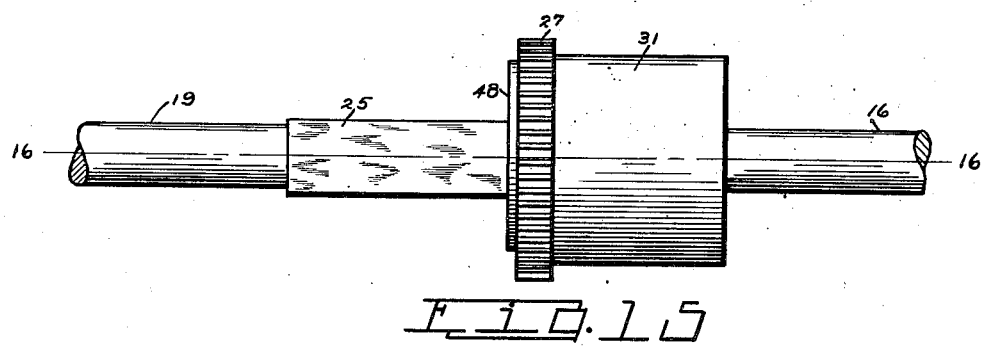
Figure 15 is an elevational view per se of a bi-sectional drive shaft, illustrating a square portion on one section, and a gear and cylindrical housing on the other section.
Figure 16:
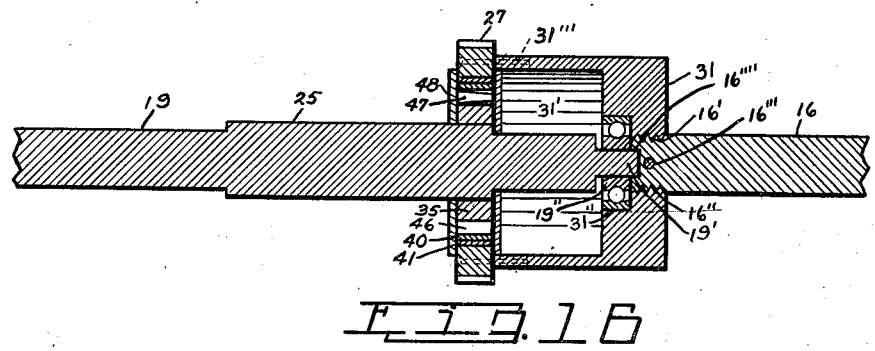
Figure 16 is a longitudinal sectional view taken on line 16—16 of Figure 15 illustrating how the cylindrical housing is mounted to one section of the bi-sectional drive shaft having a bore, and how one end of the other shaft section has a reduced portion that engages the bore and rotatable therein and in the cylindrical housing.

Within the gears 27, 28 and 29 is mounted cam mechanism as illustrated in Figures 7 and 14 of the drawings. The cam mechanism as illustrated in detail in Figure 7 of the drawings, comprises a member 35 having a squared central opening 36, a plurality of threaded bores 37 and radial arms or projections 38, the opposite sides of the radial arms being grooved at 39, and it is to be noted that the grooves 39 are deeper at one end than at the other. The member 35 is mounted in an annular band 40 and surrounding the band 40 is a band 41 which is of less thickness in cross-section than the band 40, the bands providing a locking and unlocking means with the gears, the outer peripheral wall of band 41 engaging the inner peripheral wall of the gears through the co-action of operating mechanism housed in the housing 35 and band 40, the band 40 also serving as a retaining means for the mechanism in the housing 35. The outer peripheral wall of the band 41 also serves as a bearing surface for rotation of the gears. In each arm 38 of the member 35 is a bore 42 in which bore is mounted a plunger 43 and a spring 44. The plunger is provided with a bore 45 into which one end of the spring 44 is housed, the plunger being freely movable in the bore 42. The squared or central opening 36 in the member 35 engages the squared portions 25 and 26 of shaft 19 and countershaft 23, the member being keyed or otherwise secured to the shafts. In the present showing I have illustrated parts of the shafts 19 and 23 as being squared, and I wish to have it understood that I do not wish to limit or confine myself to this particular shape, as other means may be employed, such as splines on the shafts.

Figure 8:
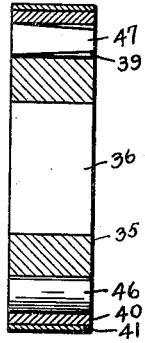
Figure 8 is a vertical sectional view taken on line A—A of Figure 7 looking in the direction of the arrows, portions being broken away and parts in section.
Figure 9:
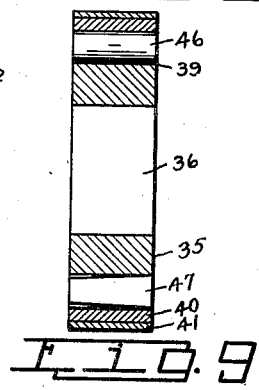
Figure 9 is a vertical sectional view taken on line B—B of Figure 7 looking in the direction of the arrows.
Figure 12:
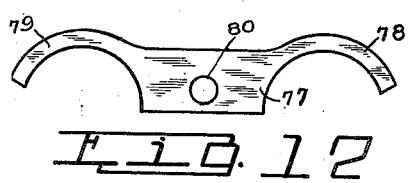
Figure 12 is a detailed elevational view of the yoke that engages the sliding transmission locks.

Mounted in the grooves 39 for sliding movement therein, is a roller bearing 46, wedge 47 and fingers D, the shape of the wedge being illustrated in Figures 8 and 9 of the drawings. The particular shape of the wedge forms an important part of the present invention, and as illustrated the wedge is of a tapered shape which provides a means in the cam assembly for keeping the roller bearing 46 in a straight or level position during its forward and backward movement in the groove 39 through the medium of fingers D. Gears 27, 28 and 29 are provided with cover plates 48 having a plurality of apertures 49 that are in register with the bores 37 in the member 35 and the plates are securely held to the members 35 by screws 50. The cover plates are further provided with oblong openings 51 and these openings are in register with the grooves 39 at the narrowest depth of the grooves. The cover plates 48 are of greater diameter than the cam assembly and serve a twofold purpose; they retain the cam mechanism in some of the gears and also act as a guard in keeping the mechanism free from dirt and grit thus preventing the cam mechanism from becoming jammed, and the apertures or openings 51 further serve as a guide means for the fingers.

Mounted on the shafts 19 and 23 intermediate the gears 27, 28, 29 and 30 are sliding sleeve locks 52 and 53. The sleeve lock 52 comprises a body 54 and flanges 55 and 56, and centrally of the body 54 and the flanges 55 and 56 is a square opening that engages the square part 25 of the shaft 19. Intermediate the flanges 55 and 56 is a groove 57 for a purpose to be later described. As illustrated in the drawings, and in detail in Figure 5, the flange 56 is of a smaller diameter than the flange 55. Each of the flanges 55 and 56 has a plurality of fingers 58 and 59, each of the fingers having a head 60 secured in recesses in the outer peripheral walls of the flanges by screws 61. At this point I wish to have it understood that the fingers and the flanges of the sleeve locks may be of integral structure and therefore do not limit myself to the structure shown in Figures 4 and 5. The fingers 58 and 59 on the flanges of sleeve locks 55 and 56 are identical in structure and comprise a head 60, a substantially straight side wall 62 and broad end 63. The other side wall 64 of the fingers converge towards the head 60, the fingers being of a reduced width at 65 and uniplanar with the flange edges 66 and 67 of the lock 52.

Figure 5:
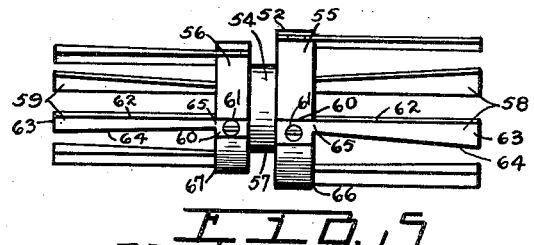
Figure 5 is a detail of another form of sliding transmission lock.
Figure 6:
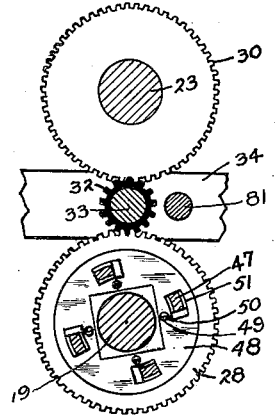
Figure 6 is a sectional view taken on line 6—6 of Figure 1 looking in the direction of the arrows.

In Figure 4 of the drawings I have illustrated in detail sleeve lock 53 which comprises an annular body 68 and flanges 69 and 70, the flange 70 being of a less diameter than flange 69 and this flange serves as a guard. The sleeve lock 53 is provided with a square central opening that engages the square part 26 of the shaft 23. Intermediate the flanges 69 and 70 is a groove 71 for a purpose to be later described. As illustrated in detail in Figure 4 of the drawings, a plurality of fingers 72 are secured in recesses in the outer peripheral wall of the flange 69 by screws 73. The fingers of sleeve lock 53 have a straight edge wall 74, the opposite edge wall 75 tapering towards the finger ends 76, the broadest portion in width of the fingers 72 being in the recessed portions in the flange 69.

Figure 13:
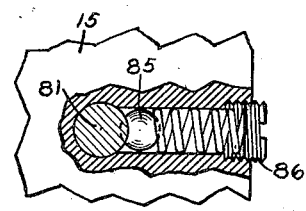
Figure 13 is an enlarged fragmentary detail view of the shifting rod engaging mechanism, parts in section and portions broken away.

Straddling the sliding sleeve locks 52 and 53 is a yoke 77 having arcuate ends 78 and 79 that engage the grooves 57 and 71 in the sleeve locks respectively. The yoke 77 is provided with a threaded aperture 80 into which is connected the threaded end portion of shift rod 81. The shift rod 81 is slidably mounted in bearings in the casing 15 and in the transverse bar 34, the rod being provided with recesses 82, 83 and 84. In Figure 13 of the drawings I have illustrated the means for engaging the recesses 82, 83 and 84 in the shift rod 81, said means comprising a spring actuated ball 85 mounted in a bore in the casing 15 and having a tension adjusting screw 86.

Figure 10:
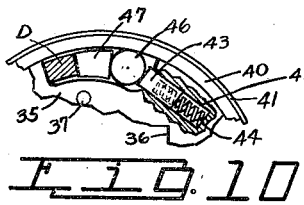
Figure 10 is a fragmentary view illustrating the position assumed by the parts housed in some of the gears when the sliding transmission locks are in neutral position.

In the clutch assembly illustrated in Figure 1 of the drawings, the sliding sleeve locks 52 and 53 are illustrated in neutral position and in this position the fingers on the locks 52 and 53 cause the cam parts 43, 44, 46 and 47 to assume in gears 27, 28 and 29 the position indicated in Figure 10 of the drawings, the fingers being shown in section and marked D.

Figure 11:
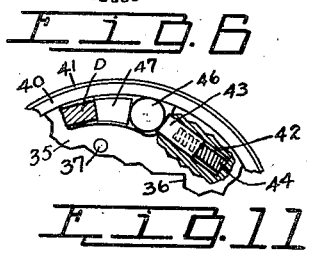
Figure 11 is a fragmentary view illustrating the position assumed by the parts housed in some of the gears when disengaged from the gears.

In the assembly illustrated in Figure 2 of the drawings, the sliding sleeve locks are illustrated in forward position and in this position the fingers cause the cam parts 43, 44, 46 and 47 to assume in gear 27 the position indicated in Figure 7, and in gears 28, and 29 the position indicated in Figure 11 of the drawings, the fingers being shown in section and marked D.

In the assembly illustrated in Figure 3, the sliding sleeve locks 52 and 53 are illustrated in reverse position and in this position the fingers cause the cam parts 43, 44, 46 and 47 to assume in gears 28 and 29 the position indicated in Figure 7 of the drawings, and in gear 27 the position indicated in Figure 11, of the drawings, the fingers being shown in section and marked D.

In the operation of my novel transmission, assuming the assembly is in neutral position as illustrated in Figure 1 of the drawings, gears 27 and 29 rotate freely around the cam mechanism, gears 28, 30 and 32, shafts 19 and 23 and sleeve locks 52 and 53 remain stationary, cam parts 43, 44, 46 and 47 in gears 27, 28 and 29 assuming the position illustrated in Figure 10 of the drawings, the gear 27 rotating in a clockwise direction and gear 29 in an anti-clockwise direction around the cam mechanism housed in these gears. The spring actuated ball 85 engages the recess 83 in the shift rod 81. Shaft 16 rotates independent of the shaft 19.

When the transmission is shifted to the forward position as illustrated in Figure 2 of the drawings, the fingers 58 of sleeve lock 52 move to their narrowest width in the grooves 39 in gear 27, the wedges 47, roller bearing 46 and the plunger 43 through the medium of the spring 44 moves in a clockwise direction, the spring exerting a pressure to the plunger, which in turn forces the roller bearing and the wedge to the narrowest or opposite side of the groove 39, impinging the wedge against the fingers 58 and at the same time jamming the wedges against the inner peripheral wall of the band 40 causing a slight expansion, which expansion causes the band 41 to engage the inner peripheral wall of the gear 27 thus locking the cam assembly as illustrated in Figure 7 of the drawings and in position for rotation of the gear. The fingers 59 of sleeve lock 52 and the fingers 72 of sleeve lock 53 are moved towards their broadest widths and during the movement the tapering fingers exert a pressure against the wedges 47, which in turn exert a pressure to the roller bearings 46, then to the plunger 43 which compresses the spring 44 slightly until the cam parts 47, 46, 43 and 44 assume the position illustrated in Figure 11 of the drawings. In the forward position of the transmission the gears 28 and 29 are disengaged from the cam mechanism in the gears, gear 29 rotating in an anti-clockwise direction freely around the cam mechanism therein, while gears 28, 30 and pinion gear 32 and countershaft 23 remain stationary. Shaft 19, gear 27 locked to the sleeve lock 52 through the medium of the fingers 58 as illustrated in Figure 7 of the drawings cause the gear 27 to rotate in a clockwise direction and meshing with the gear 29 to rotate in an anti-clockwise direction.

When the clutch assembly is shifted to the reverse position as illustrated in Figure 3 of the drawings, the fingers 59 of lock 52 and fingers 72 of lock 53 are moved to their narrowest width in the grooves 39 in gears 28 and 29, the wedges 47, roller bearings 46 and the plunger 43 through the medium of the spring 44 move in a clockwise direction, the spring exerting a pressure against the plunger which is imparted to the roller bearing, then to the wedge, the parts moving towards the narrowest or opposite side of the grooves 39 impinging the wedge against the fingers 59 of sleeve lock 52 and the fingers 72 of sleeve lock 53. The wedge 47 jams against the inner peripheral wall of the band 40 causing a slight expansion, which expansion causes the band 41 to engage the inner peripheral wall of the gears 28 and 29 thus locking the cam mechanism in said gears to the gears as illustrated in Figure 7 of the drawings and in position for rotation. The fingers 58 of sleeve lock 52 are moved towards their broadest widths and during the movement the tapering fingers 58 exert a pressure against the wedges 47 which in turn exert a pressure against the roller bearings 46, then to the plunger 43 which compresses the spring 44 slightly until the cam parts 47, 46, 43 and 44 moving in an anti-clockwise direction assume the position illustrated in Figure 11 of the drawings. In the reverse position the gears 28 and 29 are locked to the cam mechanism therein and in this position the following movement of the assembly takes place, shaft 19, sleeve lock 52, gears 28, 29, sleeve lock 53, countershaft 23 all rotate in an anti-clockwise direction. Gear 27 and cylinder 31 to which it is secured, being unlocked from the cam mechanism therein rotate freely around the cam mechanism housed therein in a clockwise direction, the shaft 16 and the pinion gear 32 also rotating in a clockwise direction.

While the preferred form of the invention has been herein shown and described, it is to be understood that various changes may be made in details of construction and in the combination and arrangement of the several parts, within the scope of the claims without departing from the spirit of the invention.

What I claim is:—

1. In a transmission, the combination of a drive shaft, a driven shaft co-axial with said drive shaft, a countershaft parallel thereto, a housing member fixedly secured to the drive shaft, drive means fixedly mounted on said housing member, drive means rotatably mounted on the driven shaft, driving means on the countershaft, one of said driving means fixedly secured to said countershaft, the other of said driving means rotatable on said countershaft, a pinion means in mesh with the drive means on the driven shaft and with the drive means fixedly secured to the countershaft, housing members fixedly mounted on the driven shaft and internally of said driving means on said driven shaft and said drive means on the drive shaft, a further housing member internally of said rotatably mounted countershaft drive means, expansible means mounted on the outer periphery of each of said housing members, a plurality of operating means carried by each of said housing members and adapted for engagement with said expansible means, each of said drive means being freely rotatable when its respective expansible means is in contracted position and operatively connected with its associated shafts when said expansible means is in expanded position, means slidably mounted on said driven and countershafts having means for engaging and disengaging the said plurality of operating means, means connecting said slidable means for synchronously shifting said slidable means.

2. In a transmission, the combination of a drive shaft, a driven shaft in alignment therewith and a countershaft, one end of the driven shaft being rotatably mounted in the drive shaft, a cylindrical housing fixedly secured to the drive shaft, a drive means fixedly mounted on said cylindrical housing, a second drive means rotatably mounted on the countershaft and driven from the first drive means, a third drive means rotatably mounted on the driven shaft means for driving said third drive means from the countershaft, bands mounted in said driving means adapted to frictionally engage the said drive means, housing members mounted on the driven shaft and a housing member on the countershaft, said housing members being mounted in the respective drive means, a plurality of means carried by each of said housing members and adapted for engagement with the respective bands, slidable means mounted on the driven and counter shafts having fingers for engaging and disengaging the operating means, means connecting said slidable means for synchronously shifting said slidable means.

3. In a transmission, the combination of a drive shaft, a driven shaft in alignment therewith and a countershaft, a cylindrical housing fixedly secured to the drive shaft, a drive means fixedly mounted on said cylindrical housing, a second drive means rotatably mounted on the countershaft and driven from the first drive means, a third drive means rotatably mounted on the driven shaft, means for driving said third drive means from the countershaft, bands mounted in said driving means adapted to frictionally engage the said drive means, housing members mounted on the driven shaft and a housing member on the countershaft, said housing members being mounted in the respective drive means, a plurality of means carried by each of said housing members and adapted for engagement with the respective bands, slidable means mounted on the driven and countershafts having fingers for engaging and disengaging the operating means, and means for shifting said slidable means.

4. In a forward and reverse drive transmission, the combination of a drive shaft, a driven shaft co-axial with said drive shaft, a countershaft parallel thereto, a gear fixedly mounted on said drive shaft and enclosing said drive shaft, a gear rotatably mounted on the countershaft in mesh with said drive shaft gear, a gear fixed to said countershaft, a gear rotatably mounted on the driven shaft, an idler gear in mesh with said fixed countershaft gear and said gear on the driven shaft, housing members fixedly mounted on said driven shaft internally of said driven shaft gear and said drive shaft gear respectively, a further housing member internally of said rotatably mounted countershaft gear, expansible band means mounted on the outer periphery of each of said housing members, each of said gears being freely rotatable when its respective band is in contracted position and operatively connected with its associated shafts when said band is in expanded position, transmission shifting means slidably mounted on said driven and countershafts, means for selectively actuating said band means comprising tapered finger means extending from said transmission shifting means through each of said housings, said finger means being of opposite taper.

5. In a forward and reverse drive transmission, the combination of a drive shaft, a driven shaft co-axial with said shaft, a countershaft parallel thereto, a gear fixedly mounted on said drive shaft and enclosing said drive shaft, a gear rotatably mounted on the countershaft in mesh with said drive shaft gear, a gear fixed to said countershaft, a gear rotatably mounted on the driven shaft, an idler gear in mesh with said fixed countershaft gear and said gear on the driven shaft, housing members fixedly mounted on said driven shaft internally of said driven shaft gear and said drive shaft gear respectively, a further housing member internally of said rotatably mounted countershaft gear, expansible band means mounted on the outer periphery of each of said housing members, means carried by the housing members for engaging and disengaging the bands, each of said gears being freely rotatable when its respective band is in contracted position and operatively connected with its associated shafts when said band is in expanded position, transmission shifting means slidably mounted on said driven and countershafts, means for selectively actuating said band means comprising tapered finger means extending from said transmission shifting means through each of said housings, said finger means being of opposite taper.

6. In a forward and reverse drive transmission, the combination of a drive shaft, a driven shaft co-axial with said drive shaft, a counter shaft parallel thereto, a gear fixedly mounted on said drive shaft and enclosing said drive shaft, a gear rotatably mounted on the countershaft in mesh with said drive shaft gear, a gear fixed to said countershaft, a gear rotatably mounted on the driven shaft, an idler gear in mesh with said fixed countershaft gear and said gear on the driven shaft, housing members fixedly mounted on said driven shaft internally of said driven shaft gear and said drive shaft gear respectively, a further housing member internally of said rotatably mounted countershaft gear, expansible band means mounted on the outer periphery of each of said housing members, the periphery of the housing members being formed with cam surfaces, rollers situated in said cam surfaces, finger means adapted to move the rollers in such fashion to engage and disengage the bands, each of said gears being freely rotatable when its respective band is in contracted position and operatively connected with its associated shafts when said band is in expanded position, transmission shifting means slidably mounted on said driven and countershafts, means for selectively actuating said band means comprising tapered finger means extending from said transmission shifting means through each of said housings, said finger means being of opposite taper.

CHARLES HECKMAN.